UNITED STATES PATENT OFFICE.

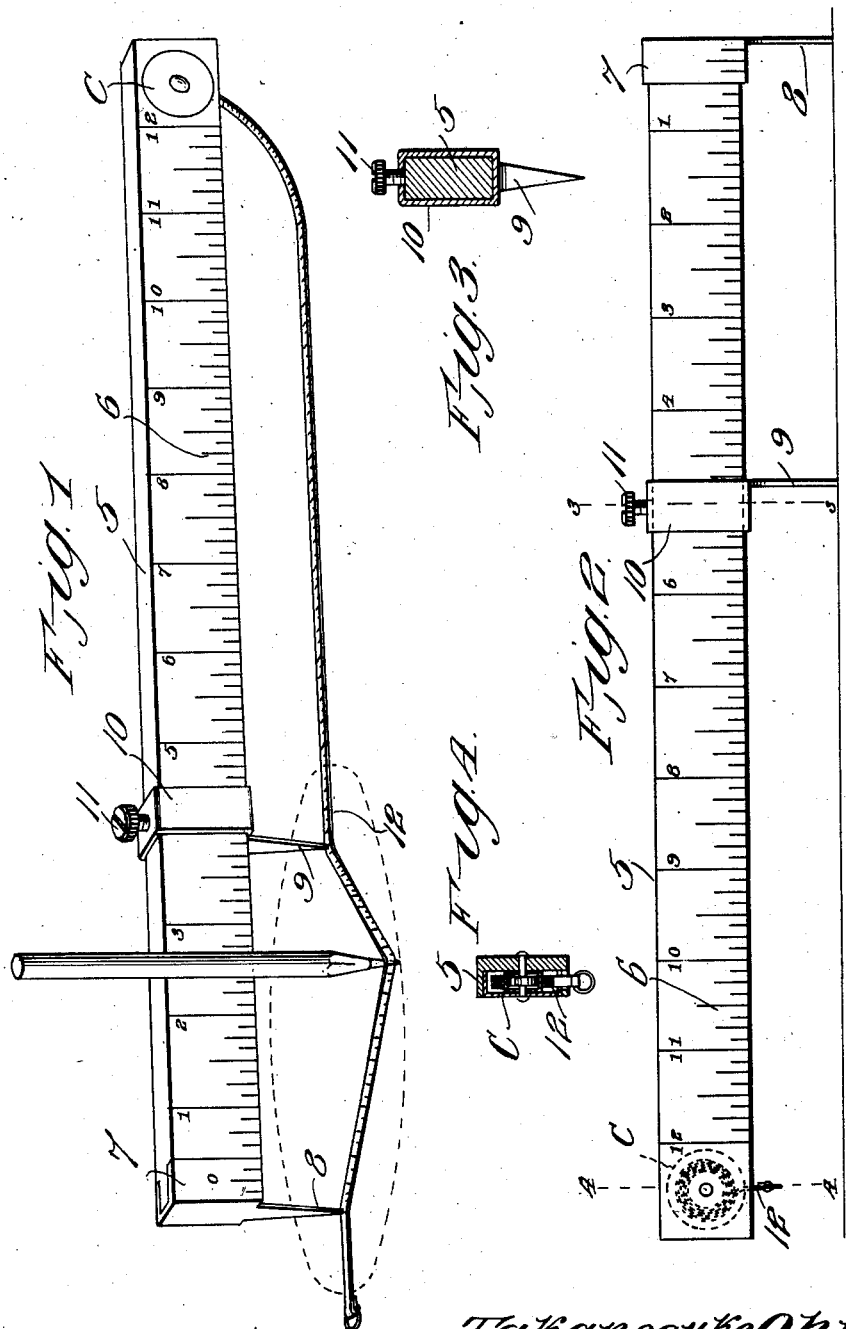

TAKANOSUKE OHYE, OF SAN DIEGO, CALIFORNIA.

ELLIPSOGRAPH.

1,022,969.  Specification of Letters Patent.  Patented Apr. 9, 1912.

Application filed November 13, 1909. Serial No. 527,831.

*To all whom it may concern:*

Be it known that I, TAKANOSUKE OHYE, a subject of the Emperor of Japan, residing at San Diego, in the county of San Diego and State of California, have invented new and useful Improvements in Ellipsographs, of which the following is a specification.

This invention relates to drawing instruments and it has particular reference to that class of devices which are known as ellipsographs and which are used for the purpose of constructing true elliptical figures.

The invention has for its object to provide a device of this character which shall possess superior advantages in point of simplicity, durability and general efficiency; and with these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention, may be resorted to when desired.

In the drawings: Figure 1 is a perspective view of the improved ellipsograph illustrating the operation of the same. Fig. 2 is a side view of the device. Fig. 3 is a transverse sectional view taken on the plane indicated by the line 3—3 in Fig. 2. Fig. 4 is a sectional detail view taken on the plane indicated by the line 4—4 in Fig. 2.

Corresponding parts in the several figures are denoted by like characters of reference.

The ruler 5 of suitable length upon one or both sides or faces of which measuring scales, as 6 have been laid off, is provided at one end with a ferrule or cap 7 having a downward projecting sharp pointed leg 8. A similar leg 9 is formed or affixed upon a sleeve 10 slidably engaging the ruler in such a manner as to project in the same direction as the leg 8 and in approximately parallel relation to the latter. A set screw 11 is provided whereby the sleeve 10 may be securely retained in any position to which it may be adjusted.

A narrow tape line or tape measure 12 is used in connection with the ruler and its attachments, and said tape line may for convenience be coiled upon a spring actuated spool or drum suitably supported within a casing C adjacent to one end of the ruler, the measuring tape being wound or coiled upon the drum in such a manner that by pulling the tape to unwind the same from the drum, the actuating spring of said drum will be wound so that the tape will be wound by the tension of the spring when released. This mechanism is well understood to be common in connection with tape measures and is used in connection with this invention only to afford a convenient tape carrying means which will prevent the possibility of the tape being lost or displaced; which will insure its being always in readiness for use; and which will admit of only such portion of the tape being projected or extended from the case as it may be desired to make use of at a given time.

In operation, the points of the legs are spaced apart the requisite distance which may be readily determined by proper adjustment of the sleeve 10 upon the body of the ruler. A portion of the tape line is then withdrawn from its casing, and the desired predetermined portion of the tape line is included between the legs, the sharp points of which may be placed upon the tape above the paper or article upon which an elliptical marking or figure is to be made, the tape line being firmly secured by means of said sharp pointed legs. The point of a pencil is then inserted within the looped portion of the tape included between the legs 8 and 9, and an elliptical figure will then be traced by permitting the pencil point to follow the limb or loop, the point of the pencil being transferred from one side of the ruler to the other at the ends of the major axis of the ellipse.

Having thus described the invention, what is claimed is—

1. In a device of the character described, a ruler, a cap or ferrule mounted upon one end of the ruler and having a downwardly projecting sharp pointed leg, a sleeve adjustable upon the ruler and having a sharp pointed leg projecting therefrom, said leg being shaped and pointed similarly to that projecting from the cap, means for securing the sleeve in adjusted position, a casing formed upon the other end of the ruler, a tape measure, and means for coiling the latter within the casing, said tape measure being adapted to be releasably engaged and retained by the pointed members to form an ellipsograph guide.

2. A ruler having a stationary sharp pointed member extending therefrom, and an adjustable sleeve having a sharp pointed member, and a tape measure permanently associated with the ruler, said tape measure being adapted to be releasably engaged and retained by the pointed members to form an ellipsograph guide.

3. A ruler provided at one end with a sharp pointed projection and at the opposite end with a casing, a tape measure contained in said casing, and a sleeve slidable upon the ruler between the casing and the stationary sharp pointed member, said sleeve being provided with a set screw whereby it may be secured in adjusted position and with a sharp pointed member extending therefrom, said tape measure being adapted to be releasably engaged and retained by the pointed members to form an ellipsograph guide.

In testimony whereof I affix my signature in presence of two witnesses.

TAKANOSUKE OHYE.

Witnesses:
 JOS. SASSANOTO,
 EDWARD W. KRIPPS.

Copies of this patent may be obtained for five cents each, by addressing the "Commissioner of Patents, Washington, D. C."